United States Patent [19]

Meuschke et al.

[11] Patent Number: 5,040,287

[45] Date of Patent: Aug. 20, 1991

[54] HEATING EQUIPMENT INSTALLATION SYSTEM

[75] Inventors: Robert E. Meuschke, Monroeville; Paul P. Pomaibo, North Huntingdon, both of Pa.

[73] Assignee: The United States of America as represented by the United States Department of Energy, Washington, D.C.

[21] Appl. No.: 368,495

[22] Filed: Jun. 19, 1989

[51] Int. Cl.$^5$ ............................................. B23P 19/00
[52] U.S. Cl. ..................................... 29/723; 29/281.4; 29/281.6; 376/249; 376/260
[58] Field of Search ............... 376/249, 260, 463, 264, 376/268; 29/157 R, 723, 726, 281.4, 281.6

[56] References Cited

U.S. PATENT DOCUMENTS

| | | | |
|---|---|---|---|
| 3,183,162 | 5/1965 | Chemin et al. | 376/264 X |
| 3,583,892 | 6/1971 | Isaac | 376/268 |
| 3,809,608 | 5/1974 | Katz, et al. | 176/87 |
| 4,174,999 | 11/1979 | Burns | 176/19 |
| 4,309,583 | 1/1982 | Krauss et al. | 219/7.5 |
| 4,319,961 | 3/1982 | Coussau et al. | 376/260 |
| 4,446,099 | 5/1984 | Schuina et al. | 376/249 X |
| 4,515,559 | 5/1985 | Parker | 432/10 |
| 4,594,774 | 6/1986 | Barket et al. | 29/723 |
| 4,696,786 | 9/1987 | Frizot et al. | 376/260 X |
| 4,723,611 | 2/1988 | Scralis et al. | 376/260 X |
| 4,728,482 | 3/1988 | Boyle et al. | 376/249 |

OTHER PUBLICATIONS

*In-Place Thermal Annealing of Nuclear Reactor Pressure Vessels*, Prepared by W. L. Server for the U.S. Nuclear Regulatory Commission, NUREG/CR-4212 EGG-M-S-6708, 1985.

Primary Examiner—Mark Rosenbaum
Assistant Examiner—Frances Chin
Attorney, Agent, or Firm—E. F. Possessky

[57] ABSTRACT

A method for installing a heater unit assembly (52, 54) in a reactor pressure vessel (2) for performance of an annealing treatment on the vessel (2), the vessel (2) having a vertical axis, being open at the top, being provided at the top with a flange (6) having a horizontal surface, and being provided internally, at a location below the flange (6), with orientation elements (8) which are asymmetrical with respect to the vertical axis, by the steps of:

providing an orientation fixture (10) having an upwardly extending guide member (18) and orientation elements (14, 16) and installing the orientation fixture (10) in the vessel (2) so that the orientation elements (14,16) of the orientation fixture (10) mate with the orientation elements (8) of the pressure vessel (2) in order to establish a defined position of the orientation fixture (10) in the pressure vessel (2), and so that the guide member (18) projects above the pressure vessel (2) flange (6);

placing a seal ring (30) in a defined position on the pressure vessel (2) flange (6) with the aid of the guide member (18);

mounting at least one vertical, upwardly extending guide stud (40) upon the seal ring (30);

withdrawing the orientation fixture (10) from the pressure vessel (2); and moving the heater unit assembly (52,54) vertically downwardly into the pressure vessel (2) while guiding the heater unit assembly (52,54) along a path with the aid of the guide stud (40).

5 Claims, 3 Drawing Sheets

HEATING EQUIPMENT INSTALLATION SYSTEM

This invention was made under government contract, and the Federal Government may have rights in the subject invention.

CROSS REFERENCE TO RELATED APPLICATIONS

The following applications disclose subject matter which is related to the present invention. All of these applications were filed on June 19, 1989, and are identified by title, the Westinghouse Electric Corporation Docket Number and Ser. No.:

MODULAR ANNEALING APPARATUS FOR IN SITU REACTOR VESSEL ANNEALING AND RELATED METHOD OF ASSEMBLY - 54,690, Ser. No. 07/368,454;

WATER FILLED TANKS FOR TEMPORARY SHIELDING OF REACTOR VESSEL INTERNALS AND METHOD OF ASSEMBLY - 54,691, Ser. No. 07/368,433;

COFFER DAM FOR TEMPORARY SHIELDING OF REACTOR VESSEL INTERNALS AND METHOD OF ASSEMBLY - 54,692, Ser. No. 07/368,635;

REACTOR VESSEL ANNEALING SYSTEM - 53,611, Ser. No. 07/368,456;

ANNEALING UNIT INSERTION AND REMOVAL SYSTEM - 53,917, Ser. No. 07/363,503;

TEMPERATURE MONITORING DEVICE AND THERMOCOUPLE ASSEMBLY THEREFOR - 54,105, Ser. No. 07/368,459;

ELECTRIC RESISTANCE HEATER UNIT ASSEMBLY - 54,133, Ser. No. 07/368,432;

REACTOR VESSEL NOZZLE THERMAL BARRIER - 53,820, Ser. No. 07/368,738.

BACKGROUND OF THE INVENTION

The present invention relates to a system for installing a heater unit assembly which is used for effecting annealing treatments, particularly for annealing embrittled reactor vessels.

During the normal operation of a nuclear reactor, the reactor vessel, which is normally made of steel and which houses a core containing nuclear fuel, is exposed to intense radiation. Experience has shown that this radiation causes changes in the fine grain structure of the steel walls of the vessel. These structural changes make the walls brittle, a problem commonly referred to as reactor vessel embrittlement. Embrittlement reduces the flexibility of the vessel wall and increases the susceptibility of the vessel wall to fracturing, particularly if subjected to sudden stresses, such as due to operating transient events and pressurized thermal shock events.

Because of this embrittlement phenomenon, the United States Nuclear Regulatory Commission requires that a reactor vessel be removed from service when embrittlement reaches a predetermined stage, thus ending the useful life of this portion of the nuclear power plant. Replacement of such a vessel is extremely expensive because the vessel is built into and is a part of the reactor containment building, thereby making replacement economically impractical.

In order to deal with this problem, it has been proposed to subject such a vessel to annealing in place in order to restore the ductility and toughness of the metal constituting the reactor vessel and to perform this annealing with a heater unit assembly installed in the reactor vessel.

In order for such an annealing process to be performed successfully, it is necessary that the heating of the vessel wall be heated in a uniform manner and this requires that the heater unit assembly be accurately positioned in the vessel, and in particular that it have an accurately defined angular orientation relative to the vessel axis.

Since the construction of reactor vessels which are now in use did not take account of the need for such a subsequent annealing treatment, these vessels were not provided with any structures intended to permit proper alignment of annealing equipment. However, most such vessels are provided, on their interior surface, with guide members for aligning structures associated with the reactor core.

SUMMARY OF THE INVENTION

It is an object of the present invention to provided a method and apparatus for correctly positioning a heater unit assembly in a reactor vessel.

A more specific object of the invention is to provide a system having alignment components which guide the insertion movement of a heater unit assembly into a reactor vessel.

The above and other objects according to the invention are achieved by a method for installing a heater unit assembly in a reactor pressure vessel for performance of an annealing treatment on the vessel, the vessel having a vertical axis, being open at the top, being provided at the top with a flange having a horizontal surface, and being provided internally, at a location below the flange, with orientation means which are asymmetrical with respect to the vertical axis, the method comprising:

providing an orientation fixture having an upwardly extending guide member and orientation means, and installing the orientation fixture in the vessel so that the orientation means of the orientation fixture mate with the orientation means of the pressure vessel in order to establish a defined position of the orientation fixture in the pressure vessel, and so that the guide member projects above the pressure vessel flange;

placing a seal ring in a defined position on the pressure vessel flange with the aid of the guide member;

mounting at least one vertical, upwardly extending guide stud upon the seal ring;

withdrawing the orientation fixture from the pressure vessel; and moving the heater unit vertically downwardly into the pressure vessel while guiding the heater unit along a path with the aid of the guide stud.

The objects according to the invention are further achieved by apparatus for installing a heater unit assembly in a reactor pressure vessel for performance of an annealing treatment on the vessel, the vessel having a vertical axis, being open at the top, being provided at the top with a flange having a horizontal surface, and being provided internally, at a location below the flange, with orientation means which are asymmetrical with respect to the vertical axis, and the heater unit assembly being provided with guide passages, the apparatus comprising:

an orientation fixture having an upwardly extending guide member and orientation means, the fixture being arranged to be installed in the vessel so that the orientation means of the orientation fixture mate with the orientation means of the pressure vessel in order to establish a defined position of the orientation fixture in the pressure vessel, and so that the guide member projects above the pressure vessel flange;

a seal ring constructed to be placed in a defined position on the pressure vessel flange; and at least one guide stud mountable upon the seal ring to extend vertically upwardly when the seal ring is on the pressure vessel flange to engage the guide openings of the heater unit assembly.

DESCRIPTION OF THE PREFERRED EMBODIMENTS

Figure 1:
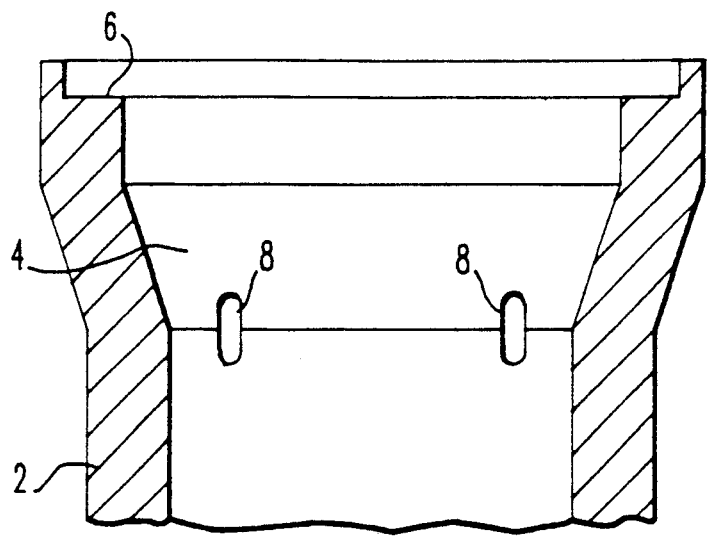
FIG. 1 is an elevational, cross-sectional view of the upper portion of a reactor vessel with which the system according to the present invention can be employed.

FIG. 1 illustrates, in cross section, the upper portion of a reactor pressure vessel 2 of the type having a sloping wall portion 4 a short distance below a top flange, or ledge, 6. Pressure vessel 2 is provided with a plurality of keyways 8 for alignment of components which are normally installed therein.

Before a heater unit can be installed in vessel 2, a seal ring and vertical studs for guiding the heater unit into place must be installed upon flange 6. Because of the nature of the heater unit and of the annealing treatment which must be performed, the heater unit must have an accurately defined angular orientation relative to pressure vessel 2. This, in turn, requires that the guide studs be positioned at defined locations about the circumference of pressure vessel 2.

In order to achieve proper alignment of the seal ring and guide studs, an orientation fixture 10 is first introduced into pressure vessel 2 and is placed in a defined angular position with the aid of keyways 8.

Figure 2:
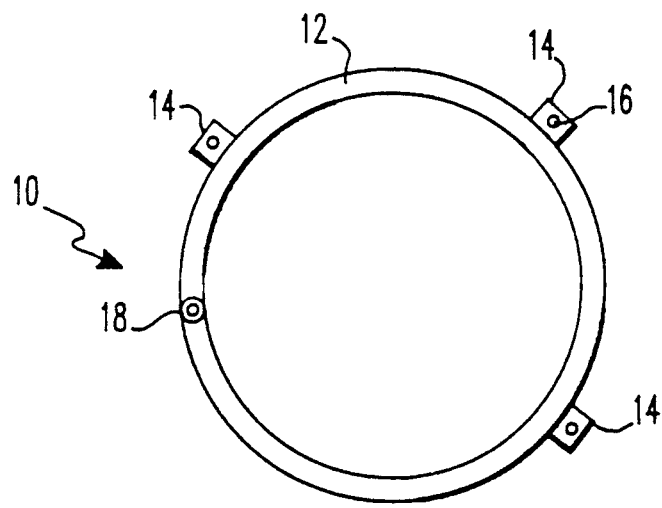
FIG. 2 is a plan view of one component of a system according to the present invention.
Figure 3:
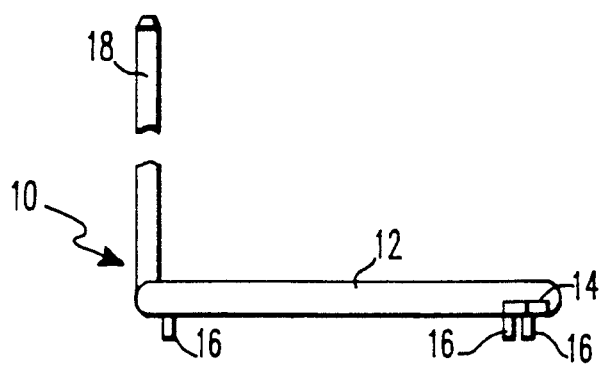
FIG. 3 is a side elevational view of the component of FIG. 2.

One embodiment of an insertion fixture according to the present invention is illustrated in FIG. 2, which is a top plan view, and in FIG. 3, which is a side elevational view. As shown in FIGS. 2 and 3, orientation fixture 10 is composed of a ring girder 12, which is a tubular member having a circular cross section. Extending laterally from girder 12 are three plates 14 each carrying a key, or pin, 16 provided to engage in a respective one of keyways 8. Extending upwardly from girder 12 is a guide column 18 which, when orientation fixture 10 has been installed in pressure vessel 2, projects above the level of flange 6.

It will be noted that keys 16, like keyways 8, are not disposed symmetrically about the axis of ring girder 12; rather, they are disposed in an asymmetric manner which assures that all three keys 16 can engage in respective keyways 8 only for one angular position of orientation fixture 10 relative to pressure vessel 2.

The guide stud 18 on orientation fixture 10 serves to orient a work platform which must be temporarily mounted on flange 6 to allow for installation of the seal ring and thermal barriers in the pressure vessel nozzles (not shown). Such thermal barriers are disclosed in the above-cited application bearing Westinghouse docket no. 53,820.

Figure 4:
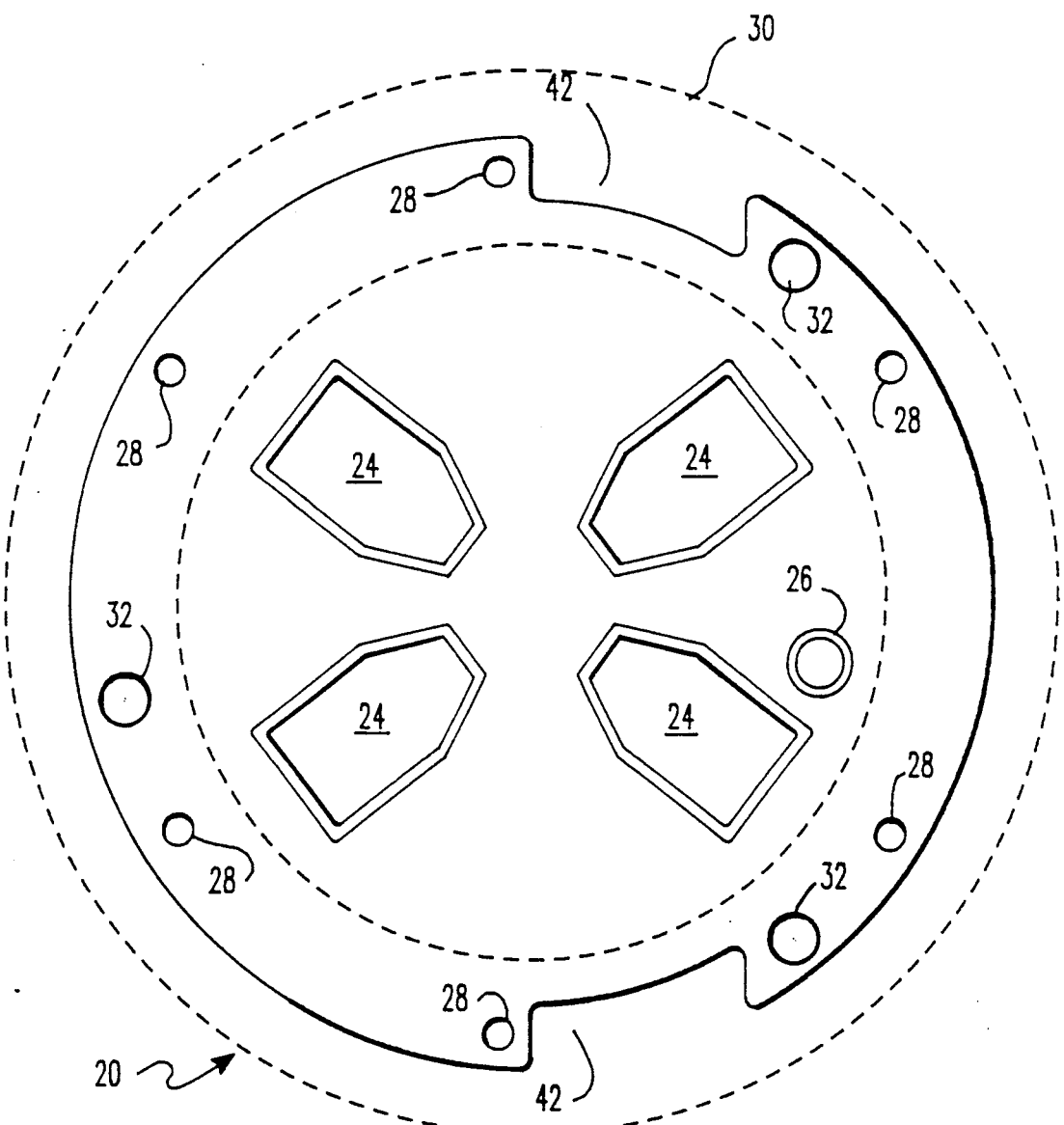
FIG. 4 is a plan view of a work platform employed in the practice of the present invention.

An embodiment of a work platform 20 is shown in plan view in FIG. 4. Platform 20 is basically circular and is provided with an array of rectangular openings 24 used primarily for the introduction of tools provided for installation of the thermal barriers. Each opening 24 may be closed by a cover which forms a flush surface with platform 20.

Platform 20 is additionally provided with an alignment opening 26 located to engage stud 18 when platform 20 is correctly oriented with respect to pressure vessel 2.

A plurality of openings 28 is provided around the periphery of platform 20 to receive retaining screws provided to retain a seal ring 30, whose outline is shown in broken lines in FIG. 4. A further plurality of openings 32 is provided around the periphery of platform 20 at locations corresponding to receptacles, e.g., threaded bores, provided on flange 6 to receive positioning pins which can be used to correctly position seal ring 30 on flange 6. Further details of platform 20 can be found in the above-cited application bearing Westinghouse Docket No. 53,820.

Preparatory to installation of a heater unit, seal ring 30 must be mounted in the proper position on vessel flange 6. To this end, with fixture 10 installed, platform 20 is lowered, by a sling attached to a lifting device, onto flange 6 while being guided by stud 18 so that the positioning pin receptacles on flange 6 are exposed by openings 32. Positioning pins 36, one of which is shown in FIG. 5, are then secured in the receptacles.

Then, platform 20 is withdrawn to an elevated work location, where seal ring 30 is attached to the underside of platform 20 by screws which extend through openings 28. Such screws may be T-screws, which are easily manipulated. After withdrawal of platform 20, orientation fixture 10 may be removed from vessel 2.

Then, platform 20 is relowered onto flange 6 while being positioned to place pins 36 in positioning holes in seal ring 30. Pins 36 and the corresponding positioning holes are distributed asymmetrically to offer only one correct angular orientation of ring 30 on flange 6.

Figure 5:
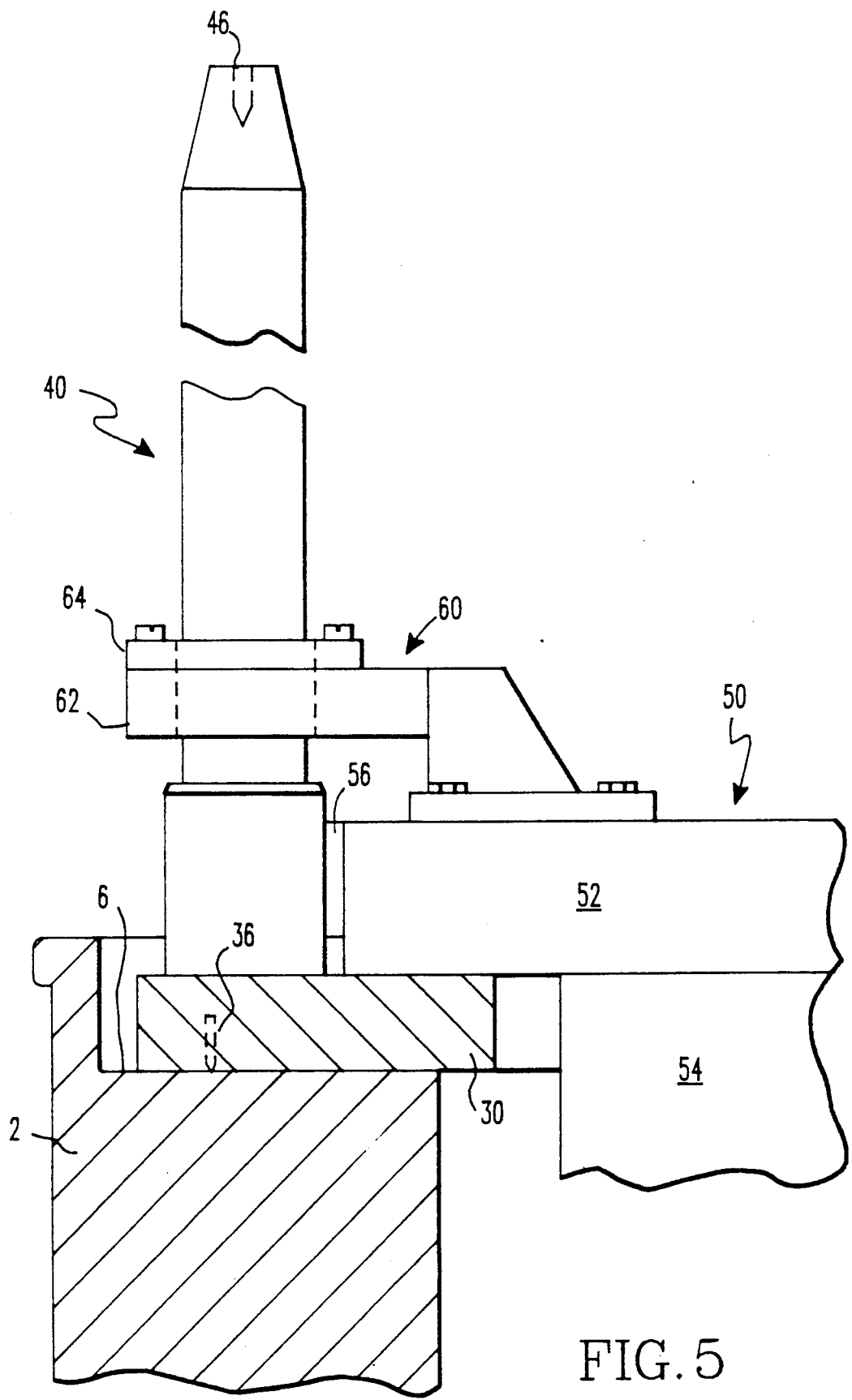
FIG. 5 is an elevational, cross-section detail view of the upper region of a reactor vessel with a heater unit assembly installed.

Then, two heater unit guide studs 40, one of which is shown in FIG. 5, are mounted in bores in ring 30, platform 20 having recesses 42 for access to those bores. As shown in FIG. 5, each stud 40 includes a bore 46 at its upper end for attachment to a lifting device.

Then, platform 20 is again withdrawn preparatory to installation of a heater unit 50. As shown in FIG. 5, heater unit 50 is composed of a top plate 52 supporting a cylindrical shell 54 which carries the heater components (not shown). Top plate 54 is formed to have two recesses 56 each receiving a respective guide stud 40. Each guide stud 40 further cooperates with a respective bracket 60 mounted on top plate 52. Each bracket 60 includes an arm 62 carrying a bushing 64 provided with a cylindrical opening through which stud 40 passes. The opening has a diameter which exceeds that of stud 40 by an amount such that while heater unit 50 is being lowered into vessel 2, the position of each stud in the opening of its respective bushing 64 can be visually monitored to assure that heater unit 50 is being positioned accurately relative to vessel 2.

Subsequent to an annealing treatment, the following sequence of operations is performed:

heater unit 50 is withdrawn from vessel 2;

work platform 20 is lowered onto ring 30 and workers on platform 20 disconnect studs 40 so that they can be withdrawn from above;

ring 30 is attached to platform 20;

platform 20 and ring 30 are withdrawn from above and ring 30 is removed from platform 20;

platform 20 is then lowered onto flange 6 so that pins 36 can be removed; and platform 20 is again withdrawn.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. Apparatus for installing a heater unit assembly in a reactor pressure vessel for performance of an annealing treatment on the vessel, the vessel having a vertical axis and an upper end which is open, being provided at the upper end with a flange having a horizontal surface, and being provided internally, at a location below the flange, with orientation means which are asymmetrical with respect to the vertical axis, and the heater unit assembly being provided with guide passages, said apparatus comprising:

an orientation fixture having an upwardly extending guide member and orientation means, said fixture being arranged to be installed in the vessel so that said orientation means of said orientation fixture mate with the orientation means of the pressure vessel in order to establish a defined position of the orientation fixture in the pressure vessel, and so that said guide member projects above the pressure vessel flange;

a seal ring constructed to be placed on the pressure vessel flange in a defined position relative to the position which will be assumed by said guide member when said orientation fixture is installed in the vessel; and at least one guide stud mountable upon said seal ring to extend vertically upwardly when said seal ring is on the pressure vessel flange to engage the guide passages of the heater unit assembly.

2. Apparatus as defined in claim 1 further comprising a work platform having means for holding said seal ring in a defined position relative to said platform to permit said seal ring to be placed in the defined position on the pressure vessel flange.

3. Apparatus as defined in claim 2 wherein said platform is provided with an opening for permitting said guide stud to be mounted upon said seal ring while said seal ring is being held by said platform.

4. Apparatus as defined in claim 1 further comprising positioning pins arranged to be mounted on the pressure vessel flange and wherein said seal ring is provided with receptacles for receiving said positioning pins when said seal ring is in the defined position on the pressure vessel flange.

5. Apparatus as defined in claim 1 wherein there are two said guide studs and said seal ring comprises means for supporting said studs at locations which are not diametrically opposite one another about the circumference of said seal ring.

* * * * *